Sept. 6, 1966  K. A. ANDERSON  3,270,885
FILTER
Filed Nov. 29, 1963  3 Sheets-Sheet 1

INVENTOR.
KENNETH A. ANDERSON
BY Robertson & Smythe
ATTORNEYS.

Sept. 6, 1966 K. A. ANDERSON 3,270,885
FILTER
Filed Nov. 29, 1963 3 Sheets-Sheet 2

INVENTOR.
KENNETH A. ANDERSON
BY Robertson & Smythe
ATTORNEYS

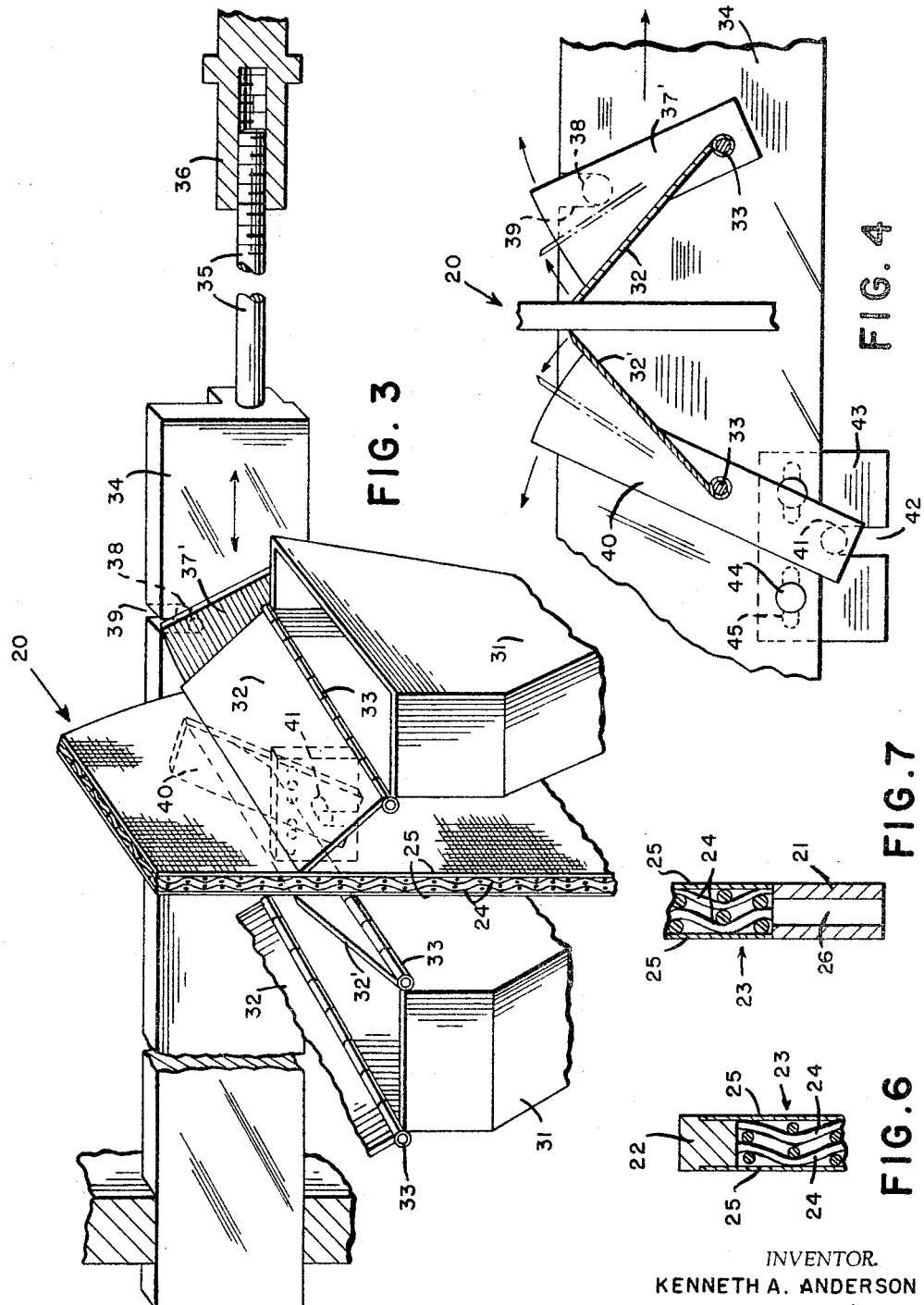

3,270,885
FILTER
Kenneth A. Anderson, Silvis, Ill., assignor to Ametek, Inc., New York, N.Y., a corporation of Delaware
Filed Nov. 29, 1963, Ser. No. 326,935
3 Claims. (Cl. 210—112)

This invention relates to rotary leaf-type pressure filters and particularly to improved cake removal mechanism for such filters so that they have the capability of continuous operation.

Rotary leaf-type pressure filters comprise a cylindrical or other shaped closed housing within which a plurality of spaced leaf filters are mounted on a shaft extending axially through the closed housing. The axially extending shaft is hollow and is in communication with the space between opposite faces of the leaf filters, which latter have the usual filter media covering said faces. The housing is only partially filled with liquid slurry to be filtered so that a substantial portion of each leaf filter extends above the level of the slurry in the housing, and the space within each leaf both below and above the slurry is in communication with the interior of the shaft. In order to remove the filter cake on the leaves of such filters, it has been the usual practice to drain the housing and to move the hollow shaft, with the leaves attached, axially to a point outside the housing where removal of the cake thereon is effected by scraping or otherwise. This requires "down time" of the filter as well as requiring a space twice as great as that occupied by the assembled filter, so that the assembled leaves and shaft can be removed from the housing.

The principal object of the present invention is to provide a continuously operable pressure filter of the rotary leaf type.

Another object of the invention is to provide such a filter in which the filter cake can be readily scraped from the filter leaves and conveyed to a discharge point while the filter continues to function.

Still another object of the invention is to provide such a continuous filter in which super atmospheric pressure is applied to the slurry, forcing it through the filter media on the submerged portions of the leaves, and is also applied to the cake on the filter media above the level of the slurry, thereby drying the cake.

Another object of the invention is to provide such a filter in which adjustable scraper blades can be moved into and out of contact with the leaves above the slurry level.

Still another object of the invention is to provide such a continuous filter in which the scrapers are arranged to discharge the removed cake into a trough having a conveying means for removing the removed cake from inside the housing without the leakage of slurry therefrom.

Still another object of the invention is to provide such a filter in which valve means normally maintains the discharge closed, which valve is opened by discharging filter cake.

Still another object of the invention is to provide such a filter in which the valve means is balanced relative to the pressure within the filter.

In one aspect of the invention, a rotary leaf-type pressure filter may comprise a totally enclosed housing capable of withstanding super atmospheric air or gas pressure. The pressure applied thereto may be controlled if desired so as to maintain a predetermined pressure therein. A hollow shaft may extend axially throughout the length of the housing and through a sealed bearing in one end thereof, to which end rotary driving means may be attached.

In another aspect of the invention, filter leaves may be attached to the hollow shaft at equal intervals therealong within the housing. The filter leaves may comprise inner and outer peripheral frame members between which may be located hollow sector elements made up of screen side walls that may be covered with filter media of any desired type. Communicating means may extend between each sector element at its juncture with the inner frame member and the interior of the hollow shaft.

In still another aspect of the invention, a tubular element may be located near the bottom of the housing and it may extend throughout the length of the housing and may be parallel with the hollow shaft. The tubular element may be closed at one end and its other end may extend through the one end wall of the housing and open to a discharge. A screw conveyor may be located within the tubular element.

In another aspect of the invention, chutes may extend from the tubular element radially upwardly between each filter leaf to a point above the normal level of the slurry within the housing. At the top of each chute, a hinged scraper may be located in position to be moved into and out of position relative to said filter leaves to remove the accumulation of cake thereon.

In still another aspect of the invention, reciprocable means may be provided having linkages between each of the scrapers so that movement of the reciprocable means in one direction places the scrapers in cake removal position, and movement in the opposite direction removes the scrapers from the leaves.

In a still further aspect of the invention, means exteriorly of the housing may be provided for operating the reciprocable means as well as for operating the screw conveyor, such being in timed relation thereto.

In still another aspect of the invention, valve means may be provided at the open end of the tubular element. This valve means may normally be resiliently urged to a closed position and balanced by being subjected on each of its sides to the pressure within the housing, such that filter cake moved into contact with the valve by the screw conveyor opens it.

The above, other objects, advantages and features of the invention will become apparent from the following specification and accompanying drawings which are merely exemplary.

In the drawings:

FIG. 3 is a sectional perspective view of a portion of the apparatus shown in FIGS. 1 and 2;

FIG. 4 is an enlarged view of a portion of the linkage shown in FIG. 3;

FIGS. 6 and 7 are sectional views of parts of the leaf filter of FIG. 5.

Figure 1:
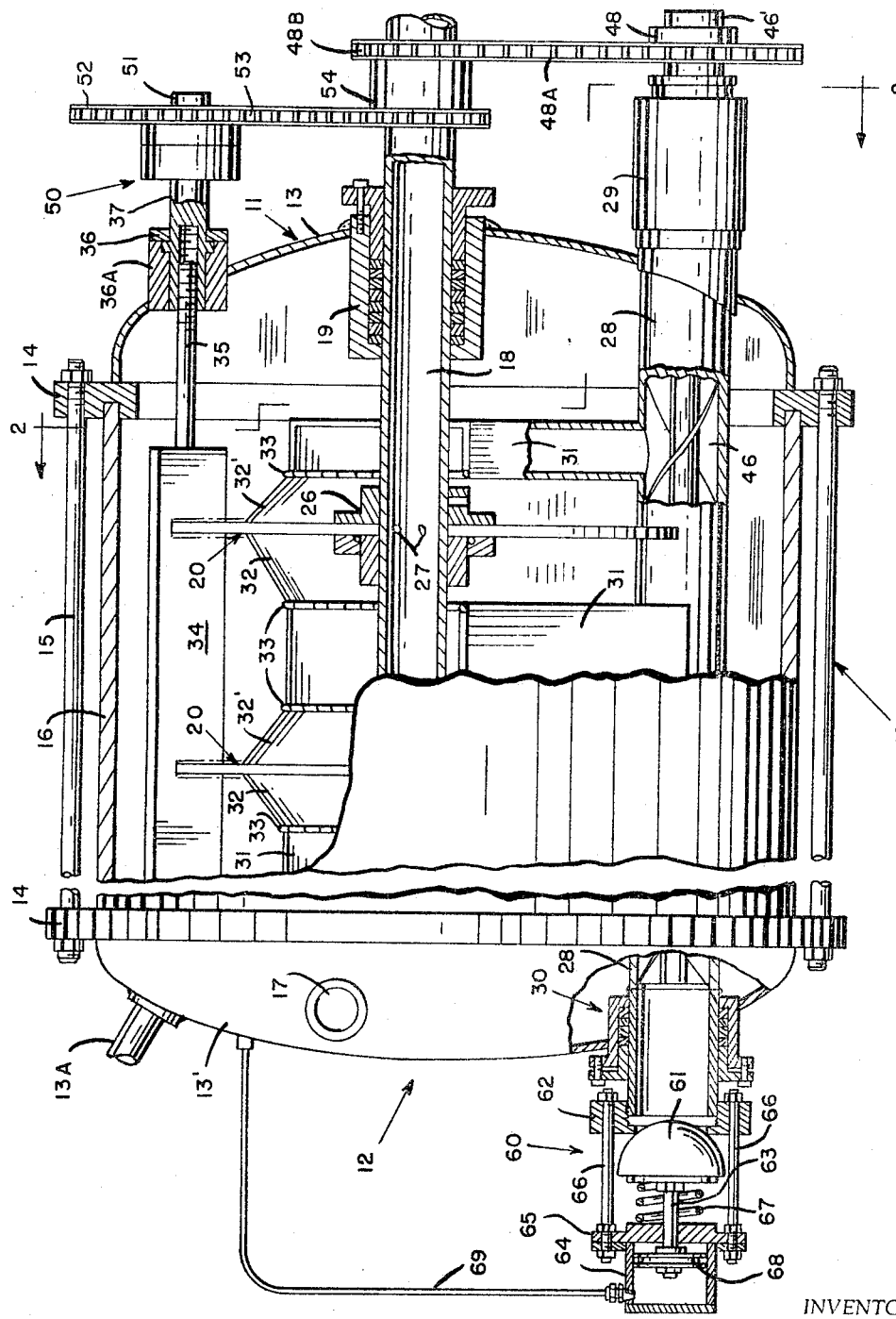
FIG. 1 is an elevational view, partly in section, of a pressure filter to which the principles of the invention have been applied.

Referring to the drawings and particularly to FIG. 1, the principles of the invention are shown as applied to a pressure filter including a housing 10 which is shown as comprising similar ends 11 and 12 made up of sheet metal domes 13 welded to rings 14 that are clamped together by tie rods 15 with a cylindrical shell 16 therebetween. The arrangement is such as to form a pressure-tight housing into which slurry to be filtered may be introduced through an inlet 17 and can be subjected to super atmospheric pressure within the housing through pipe 13A.

A hollow shaft 18 may have its one end (not shown) closed and its other end extending through a seal 19 in the dome 13 to the exterior of the housing 10. Shaft 18 may be located along the longitudinal centerline of housing 10, and it may have filter leaves 20 spaced therealong and fixed to the shaft 18. Power means (not shown) may be attached to the portion of shaft 18 exteriorly of the housing 10 for rotating the leaves 20 at a predetermined speed.

Figure 5:
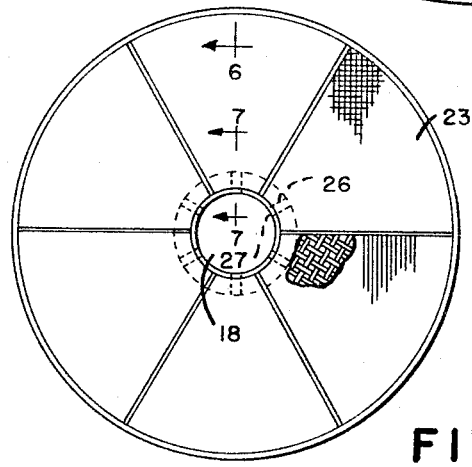
FIG. 5 is an elevational view of a leaf filter.

The leaves 20 may comprise inner and outer peripheral frame members 21, 22 (FIGS. 6 and 7). Sector-shaped frames 23 (see also FIG. 5) may be mounted between the frame members 21 and 22, and they may be composed of one or more layers of screen 24 covered by a suitable filtering medium 25 that may be secured to the face edges of members 21 and 22. The members 21 may include radial passages 26, one for each sector 23, and they may be aligned with corresponding radial passages 27 extending through the wall of hollow shaft 18.

The construction and arrangement of the parts are such that with the housing 10 partially filled with slurry and with super atmospheric air above the slurry, filtering of the slurry occurs through the submerged portion of each leaf while the exposed portions of said leaves are subjected to pressurized air passing therethrough which effects drying of the filter cake thereon.

Referring again to FIG. 1, a tubular member 28 may be mounted within the lower portion of housing 10. One end may extend through the dome 13 and a sealing means 29. The opposite end of tubular element 28 may extend through a seal 30 in the dome 13' to the exterior of housing 10, and which end is open for a purpose to be described later. Chute means 31 may be located between each filter leaf 20 as well as between the end ones and the domes 11 and 12. They may extend from the tubular member 28 upwardly to an elevation above the normal level of slurry admitted to the housing 10, said level being indicated by line L—L. At the top of each chute, a scraper blade 32 is attached to the lefthand side of the chute 31 by hinge means 33, and a scraper blade 32' is attached to the righthand side of each chute so that when the scraper blades on a chute 31 between adjacent filter leaves are separated from each other, facing sides of adjacent leaf filters will be scraped of filter cake thereon. Furthermore, when said blades 32, 32' are drawn toward each other, they are removed from cake scraping position relative to their corresponding faces of filter leaves 20. The arrangement is such that the blades 32, 32' act as aprons feeding the removed cake into the chutes 31 from which the cake gravitates into the tubular member 28.

Oscillatable movement of the scraper blades 32, 32' may be effected by a reciprocable bar 34. The bar 34 may be mounted within the housing in slide bearings. It may have a rod 35 fixed to one end, which rod may be threaded into a rotatable nut 36 that is journaled in a sealed opening extending through the shell 13 of the dome 11. The nut 36 is constrained against axial motion by engagement with bushing 36A, so that when rotated in opposite directions, rod 35 and bar 34 are reciprocated within housing 10. Shaft 37 may be fixed to nut 36 on the outside of housing 10 for rotating said nut, said shaft being connected by clutch 50 to shaft 51 upon which sprocket 52 is located. Sprocket 52 is connected by chain 53 to sprocket 54 mounted on shaft 18. The clutch when disengaged will allow reversal of nut 36.

Referring to FIGS. 3 and 4, each scraper blade 32 is fixed at its one edge to a link 37' which latter is pivoted on the pintle pin of hinge 33. A stud 38 on link 37' rides in a slot 39 extending vertically downwardly from the top of bar 34. Each scraper blade 32' is fixed at its one edge to a link 40 that is pivoted on the pintle pin of hinge 33. The end of each link 40 extends downwardly beyond the bottom edge of bar 34 and includes a stud 41 that rides in a slot 42 in a plate 43 adjustably attached to the bottom of bar 34 by bolts 44 and elongated slots 45 in bar 34.

From the foregoing it is evident that rotation of the shaft 37 in one direction will pivot the blades 32, 32' into position relative to the filter leaves 20 to scrape the filter cake therefrom while the filtering action continues uninterruptedly, and upon actuation of nut 36 rotation of shaft 37 in the opposite direction with clutch 50 disengaged moves the blades 32, 32' away from the filter leaves 20. It is also apparent that the removed cake it fed by the blades 32, 32' into the chutes 31 through which it gravitates to the tubular member 28.

Figure 2:
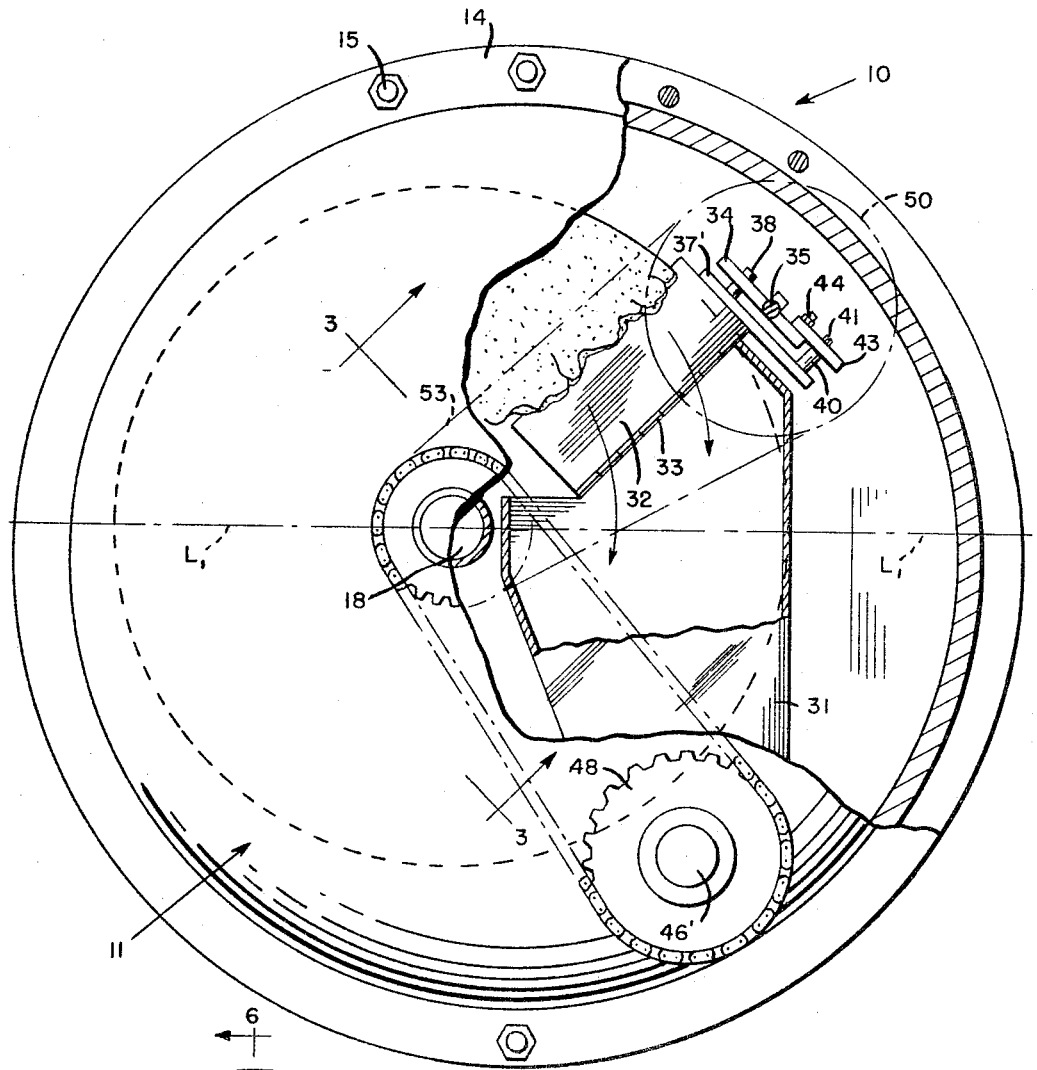
FIG. 2 is a sectional view taken substantially along line 2—2 of FIG. 1.

Referring again to FIGS. 1 and 2, a screw conveyor 46 may be provided within tubular or similar shaped member 28 and its blades may have a sufficiently close tolerance relative to the inside diameter of member 28 that substantially little air pressure escapes. The drive shaft 46' of the conveyor 46 may extend outwardly through sealing means 29. A sprocket 48 may be fixed to the end of the screw conveyor 46, sprocket 48 being connected by chain 48A which in turn engages sprocket 48B on the shaft 18. Thus, cake that gravitates into member 28 will be moved therealong as shaft 18 turns.

After prefilt has been deposited upon the leaves 20, the scraper blades can be positioned so that they will remove a small amount of the cake and material deposited thereon as filtration proceeds. Pressure may be controlledly applied to the interior of the vessel or shell 16 so as to force liquid through the filter leaves where they are in the slurry, and will continue to force liquid from the cake where it is above the level of the slurry and thereby dry out the cake. Then, as the cake reaches the scrapers, a small layer will be scraped off. This will continue until it becomes desirable again to apply a precoat to the leaves. Super atmospheric pressure also could include a difference of pressure between the interior of the vessel and the interior of the leaf but it is preferable that considerable pressure under controlled conditions be applied to the vessel.

Referring again to FIG. 1, the open end of tubular element 28 may be closed by a valve 60, shown in the embodiment disclosed as a poppet valve including a valve 61 of semispherical form. The outer, open end of tubular element 28 may threadingly receive a seat member 62 adapted to cooperate with valve 61. The seat 61 may be connected to valve rod 63 extending into a cylinder 64 mounted on a plate 65 that is connected to the seat member 62 by rods 66. A spring 67 between semispherical valve 61 and plate 65 resiliently urges valve 61 into sealing relation with seat member 62. A piston 68 within cylinder 64 may be connected to rod 63, and a line 69 may lead from cylinder 64 to the interior of housing 10 through dome 13'. The construction is such that the effective areas of piston 68 and valve 61, and seat 62 are substantially the same so that valve 61 is balanced, having pressure within housing 10 acting on both sides of valve 61. Accordingly, the force required to open valve 60 to discharge the cake from the openable end of tubular element 28 is independent of the pressure within housing 10.

Although the various features of the improved continuous filter have been shown and described in detail to fully disclose one embodiment of the invention, it will be evident that changes may be made in such details and certain features may be used without other without departing from the principles of the invention.

What is claimed is:

1. In a pressure filter, a housing adapted to be partially filled with a slurry with super atmospheric pressure thereon; a hollow longitudinally extending shaft mounted for rotation within said housing; a plurality of hollow spaced filter leaves located along said shaft within said housing and fixed to said shaft for rotation therewith; communicating passage means between the interior of said leaves and the interior of said shaft; tubular means extending along the bottom of said housing, said tubular means being closed at one end and open at the other end, which open end extends through an end wall of said housing; chute means extending upwardly from said tubular means between adjacent filter leaves and to an elevation above that of the normal level of the slurry within said housing; scraper blade means adjacent each face of each filter leaf, above the level of slurry within said housing for scraping filter cake from said leaves and feeding it into said chute means; said scraper blade means being hingedly connected for movement relative to said filter leaves and said chutes, and means mounted for reciprocable movement in said housing, and means interconnecting said last mentioned means with said scraper blade means to simultaneously move said scraper blade means into scraping relationship with both faces of at least one of said leaves; and valve means for closing the open end of said tubular means, said valve means including means for balancing it relative to the pressure within said housing.

2. In a pressure filter as defined in claim 1, wherein said reciprocable means includes an elongated bar arranged for reciprocable movement in said housing adjacent at least one end of said scraper blade means, and means for pivotally interconnecting at least one end of said scraper blade means with said bar for effecting movement of said scraper blade means relative to said filter leaves.

3. In a pressure filter, a housing adapted to be partially filled with a slurry with super atmospheric pressure thereon; a hollow longitudinally extending shaft mounted for rotation within said housing; a plurality of hollow spaced filter leaves located along said shaft within said housing and fixed to said shaft for rotation therewith; communicating passage means between the interior of said leaves and the interior of said shaft; tubular means extending along the bottom of said housing, said tubular means being closed at one end and open at the other end, which open end extends through an end wall of said housing; chute means extending upwardly from said tubular means between adjacent filter leaves and to an elevation above that of the normal level of the slurry within said housing; scraper blade means adjacent each face of each filter leaf, above the level of slurry within said housing for scraping filter cake from said leaves and feeding it into said chute means; said scraper blade means being hingedly connected for movement relative to said filter leaves and said chutes, and means mounted for reciprocable movement in said housing, and means interconnecting said last mentioned means with said scraper blade means to simultaneously move said scraper blade means into scraping relationship with both faces of at least one of said leaves; valve means for closing the open end of said tubular means; cylinder and piston means connected to said valve means; and a pressure line from said cylinder to the interior of said housing, whereby said valve is balanced by the pressure in said housing.

References Cited by the Examiner

UNITED STATES PATENTS

| | | | |
|---|---|---|---|
| 1,538,980 | 5/1925 | Genter | 210—327 X |
| 1,835,796 | 12/1931 | McCaskell | 210—117 |
| 2,072,586 | 3/1937 | Grant | 210—396 |
| 2,243,311 | 5/1941 | Ditzen | 210—396 |
| 3,080,064 | 3/1963 | Giesse | 210—327 |
| 3,096,278 | 7/1963 | Francom | 210—327 |

FOREIGN PATENTS 660,941  4/1963  Canada.

REUBEN FRIEDMAN, *Primary Examiner.*

D. M. RIESS, *Assistant Examiner.*